United States Patent [19]
Maris et al.

[11] Patent Number: 5,641,602
[45] Date of Patent: Jun. 24, 1997

[54] BLOCK COPOLYMER CONTAINING BINDER COMPOSITION AND ELECTRO PHOTOGRAPHIC TONER COMPOSITION DERIVED THEREFROM

[75] Inventors: Catherine Augusta Louis Maris; Olivier Roumache; Hans Ferdinand Vermeire, all of Louvain-La-Neuve, Belgium

[73] Assignee: Shell Oil Company, Houston, Tex.

[21] Appl. No.: 525,048

[22] Filed: Sep. 8, 1995

[30] Foreign Application Priority Data

Sep. 9, 1994 [EP] European Pat. Off. ............. 94306653

[51] Int. Cl.⁶ ..................... G03G 9/087; C08L 91/06
[52] U.S. Cl. .................. 430/110; 430/109; 430/904; 524/488
[58] Field of Search ..................... 524/488; 430/110, 430/106.6, 109

[56] References Cited

U.S. PATENT DOCUMENTS

| | | | |
|---|---|---|---|
| 3,965,022 | 6/1976 | Strong et al. | |
| 4,775,711 | 10/1988 | Kawamura et al. | |
| 5,229,242 | 7/1993 | Mahabadi et al. | |
| 5,272,212 | 12/1993 | Kitahara | 430/106.6 |
| 5,278,016 | 1/1994 | Fuller et al. | |
| 5,324,611 | 6/1994 | Fuller et al. | 430/109 |
| 5,486,445 | 1/1996 | Van Dusen et al. | 430/110 |
| 5,510,221 | 4/1996 | Matalevich et al. | 430/106.6 |

FOREIGN PATENT DOCUMENTS

| | | |
|---|---|---|
| 066 395 | 5/1982 | European Pat. Off. . |
| 0 444 900 A2 | 4/1991 | European Pat. Off. . |
| 463 840 | 6/1991 | European Pat. Off. . |
| 634 453 A2 | 1/1995 | European Pat. Off. . |
| 1035849 | 7/1966 | United Kingdom . |
| 1560896 | 2/1980 | United Kingdom . |

*Primary Examiner*—Christopher D. Rodee
*Attorney, Agent, or Firm*—Donald F. Haas

[57] ABSTRACT

Intermediate binder composition for use in toner compositions, comprising (a) a block copolymer comprising one predominantly poly(monovinyl aromatic) block per molecule and one predominantly poly(conjugated diene) block per molecule, the latter blocks being selectively hydrogenated to a residual unsaturation degree of 20% or lower, in an amount of from 5 to 35% by weight relative to the weight of the intermediate binder composition, and a microcrystalline wax, having a weight average molecular weight of from 1000 to 10,000, and having a drop point of 75° C. or higher (measured according to ASTM D 3104), in an amount of from 95 to 65% by weight relative to the weight of the binder composition. Also covered are electrophotographic toner compositions containing the intermediate binder composition and magnetizable particles.

14 Claims, No Drawings

BLOCK COPOLYMER CONTAINING BINDER COMPOSITION AND ELECTRO PHOTOGRAPHIC TONER COMPOSITION DERIVED THEREFROM

FIELD OF THE INVENTION

The present invention is relating to a block copolymer containing binder composition and to an electrophotographic toner composition derived therefrom. More in particular the invention is relating to an intermediate binder composition to be used for electrophotographic toner compositions, comprising at least one block copolymer, which is derived from a monovinylaromatic compound and a conjugated diene and which has been selectively hydrogenated and a wax.

BACKGROUND OF THE INVENTION

In the field of the electrophotography, there have recently been developed a variety of copying apparatuses, which make use of various fixing processes. A fixing process which has presently been most commonly used is the heat fusing roll process. According to such process, toner powders to be used for photocopiers are typically blends of thermoplastic polymers or copolymers, colorants, charge control agents and flow agents and have a particle diameter of 5 to 30 micron. In principle the electrophotographic process starts by bringing a uniform electric charge onto a photoreceptor by corona treatment. An image of the original document is then projected on the photoreceptor band. Because the areas of the photoreceptor that are exposed to light become conductive, the photoreceptor losses its surface charge while the dark unexposed areas remain insulating and charged.

A monolayer of toner particles charged to the opposite polarity is then applied and attracted to the charged areas. According to one of the presently used embodiments these toner particles are taken up by a silicone rubber band of low hardness at 100° C. and are transferred under pressure to the paper preheated to the same temperature, to avoid problems in the case that the paper is blocked and to clean the paper dust, a toner cleaner is also present.

A disadvantage of such a process embodiment is the heat conduction to the photoconductor which has to be cooled. Working at lower temperatures and saving of energy has become a strong aim.

Due to a required more and more increased copying speed along with an increase in the quantity of information to be processed in high speed copying apparatus, the heat of heat fusing-roll is transferred to copying paper in only a small quantity per unit area of the copying paper, while the paper takes a large quantity of heat away from the heat fusing-roll, which leads to an increase in the heat loss.

Therefore the surface temperature of the heat-fusing roll had to be decreased. On the other hand, modern household copying apparatuses are widely used, the size of the copying apparatus has been made more and more compact and the temperature as well as the pressure of the heat fusing roll has gradually been lowered or reduced.

As a result of the before mentioned speeding up and miniaturization of the copying apparatuses there was a need for toners having a powder stability until 50° C. and showing a low viscosity at 60° C., as the conventional toners exhibited only insufficient fixing ability at these desired lower temperatures.

It may be thought that the hereinbefore mentioned problem might be solved by reducing the molecular weight of the resin normally used as a binder and hence the viscosity of the resulting toner in its molten state to thus improve the flow properties and hence the fixing ability of the toner. However, another problem is formed in that the toner tends to adhere to the surface of the heat fusing roll and the adhered toner is again transferred to the subsequent copying paper (so called offset phenomenon). Moreover the strength of the binders is lowered because of the low molecular weight of the resin used. More specifically, images thermally fixed on the paper are damaged through bending and rubbing of the paper and as a result the toner adhered to the paper drops off to thus cause defects of the images.

Therefore, this method did not provide a toner having excellent fixing ability.

It will be appreciated that there has long been desired for the development of a toner composition which can be fixed at low temperature, has high resistance to mechanical breakage and does not cause any offset phenomenon.

It is an object of the present invention to provide a binder composition for toner compositions which can meet the hereinbefore mentioned requirements.

Although the inclusion of waxes in minor amounts in electrophotographic toner compositions was known, as appears e.g. from the European patent application no. 0 463,840 and U.S. Pat. Nos. 5,278,016 and 5,229,242, no binder compositions for electrophotography toners were actually provided, which could meet the hereinbefore discussed.

The European Patent Application No. 0 463 840 actually disclosed a toner composition for electrophotography, which comprised at least a binder and a coloring material as essential components, wherein the binder comprised a resin mixture, prepared by heating a resin solution, comprising a styrene resin and a block copolymer, which comprised blocks, derived from at least one member selected from ethylenic hydrocarbons and conjugated diene hydrocarbons and blocks derived from styrene, and/or a hydrogenated product thereof, in an amount ranging from 0.1 to 20 parts by weight per 100 parts by weight of the styrene resin and preferably from 0.1 to 10 parts by weight per 100 parts of binder, to remove the solvent. A low molecular weight wax having a softening point from 60° to 180° C. and preferably from 80° to 160° C. could be added to said toner composition in an amount of ranging from 0.5 to 20 parts by weight per 100 parts by weight of the binder and preferably from 0.5 to 10 parts by weight per 100 parts by weight of the binder.

In particular in pages 5, lines 20 up to 23 of this patent application there was clearly taught to a person skilled in the art, that amounts of low molecular wax exceeding 20 parts by weight per 100 parts by weight of binder composition should greatly affect the level of electrification and as a result the images obtained after copying operations should become unclear.

The U.S. Pat. No. 5,229,242 disclosed a toner composition consisting essentially of first resin particles, second cross linked resin particles, pigment, wax component particles, and a compatibilizer formed by a graft copolymer or styrene-ethylene/butylene block copolymer, a styrene-ethylene/propylene block copolymer or a styrene-ethylene/butylene-styrene block copolymer, and wherein said wax component is substantially retained in the toner composition. The wax had a weight average molecular weight of from 1000 to 10000 and more preferably it consisted of a polyolefin or a mixture of polyolefins. The wax was present in an amount of from 1 to 10 weight percent and preferably in an amount of from 3 to 7 weight percent.

U.S. Pat. No. 5,278,016 disclosed a toner composition comprising surface halogenated toner particles said toner particles each comprising a core of a low melt resin and pigment particles, and a protective shell formed over said core, said protective shell being formed by reacting a surface portion of said low melt resin with a halogen.

As low melt resin a block copolymer (A—B)n was proposed, wherein A represented a polymer block of a first monomer and B represented a block of a second monomer and n is in the range of from 2 to 100.

The toner composition could optionally contain in addition a microcrystalline wax.

As a result of extensive research and experimentation the intermediate binder composition, which could provide the desired toner compositions aimed at, could be surprisingly obtained.

SUMMARY OF THE INVENTION

Accordingly, the present invention relates to an intermediate binder composition for use in toner compositions, comprising a block copolymer comprising one predominantly poly(monovinyl aromatic) block per molecule and one predominantly poly(conjugated diene) block per molecule, the latter blocks being selectively hydrogenated to a residual unsaturation degree of 20% or lower, in an amount of from 5 to 35% by weight relative to the weight of the binder composition, and a microcrystalline wax, having a weight average molecular weight of from 1000 to 10,000, and having a drop point of 75° C. or higher (measured according to ASTM D 3104), in an amount of from 95 to 65% by weight relative to the weight of the binder composition.

DETAILED DESCRIPTION OF THE INVENTION

The present invention includes an intermediate binder composition for use in toner compositions, comprising (a) a block copolymer comprising one predominantly poly (monovinyl aromatic) block per molecule and one predominantly poly(conjugated diene) block per molecule, the latter blocks being selectively hydrogenated to a residual unsaturation degree of 20% or lower and preferably varying from 10 to 0.5% and more preferably varying from 5 to 0.5%, in an amount of from 5 to 35% by weight relative to the weight of the binder composition, and preferably in an amount of from 10 to 25%, and (b) a microcrystalline wax, having a weight average molecular weight of from 1000 to 10,000, and having a drop point of 75° C. or higher and preferably in the range from 85° C. to 100° C. (measured according to ASTM D 3104), in an amount of from 95 to 65% by weight relative to the weight of the binder composition and preferably in an amount of from 90 to 75% by weight.

With the term "predominantly" is meant that the respective blocks may be constituted by a substantial pure monomer or by a mixture of monomers, of which the mentioned one forms the major ingredient which is mixed with a structurally different or structurally similar comonomer.

The poly(monovinyl aromatic) blocks may be derived from styrene as major component, which may be mixed with minor amounts of α-methyl styrene, o-methylstyrene, p-methylstyrene, p-tert-butylstyrene 1,3-dimethylstyrene or mixtures thereof and/or mixed with minor amounts of butadiene, isoprene.

The poly(conjugated diene) blocks may be derived from butadiene or isoprene as major component, which may be mixed with minor amounts of 2-methyl-1,3-butadiene (isoprene),2,3-dimethyl 1,3-butadiene; 1,3-pentadiene; 1,3-hexadiene or mixtures thereof and/or small amounts of styrene.

It will be appreciated that the hydrogenated poly (conjugated diene) blocks in the complete block copolymer can also be obtained by cationic polymerization of alkylenes, such as ethylene, propylene, 1-butene, 2-butene, isobutylene, pentene, 2-pentene, 2-methyl-1-butene, 3-methyl-1-butene; 2-methyl-2-butene, 1-hexene and 2,3-dimethyl-2-butene.

Preferably block copolymers are applied as the first component, which only contain pure poly(styrene) and hydrogenated pure poly(butadiene) or hydrogenated pure poly(isoprene) blocks.

Preferably the block copolymers are of the structure AB, wherein A represents a predominanlty poly (monovinylaromatic) block of an apparent weight average molecular weight of from 5000 to 50,000 and B represents a predominantly poly(conjugated diene) block of an apparent weight average molecular weight in the range of from 40,000 to 160,000, said block copolymer having a monovinyl aromatic content in the range of from 5 to 70% in the total block copolymer and a vinyl content (due to 1,2 polymerization of 1,3 butadiene) of from 5 to 40% and more preferably from 15 to 35%.

More preferred block copolymers to be used as component (a) have a monovinylaromatic content in the range from 25 to 40% and apparent weight average molecular weight of the poly(monovinylaromatic) block in the range of from 30,000 to 35,000, while the diblock weight average molecular weight is in the range of from 100,000 to 200,000 and more preferably from 120,000 to 180,000.

Examples of suitable commercial block copolymer grades which can be used are KRATON®G 1701X polymer and KRATON®G 1702X polymer or SEPTON G 1001 polymer (KRATON and SEPTON are trademarks).

The waxes to be used can be selected from polyalkylenes and in particular polyethylene or polypropylene or mixtures thereof, higher fatty acid amides, and resin having a drop point of 75° C. or higher. Suitable waxes to be used according to the present invention can moreover be characterized by a congealing range starting at 70° C. or higher (measured according to ASTM D938).

A suitable example of a commercial microcrystalline wax is AT-RR9 (from BLAYSON OLEFINS), MICROWAX MMP (drop point 85° C., congealing range 70° to 74° C.), MICROWAX HMP (drop point 95° C., congealing range 84° to 88° C.) (BLAYSON and MICROWAX are tradenames) and the like.

The intermediate binder composition is preferably prepared by gradual addition under stirring of the desired amount of small block copolymer particles to the desired amount of the molten wax at a temperature of 140° to 150° C. until complete dissolution in the hot wax.

As additional component of the binder composition, a usual stabilizing agent may be added in amounts of up to 1% by weight relative to the total binder composition weight, e.g. Irganox 1010 but no other additional auxiliaries e.g. dusting agent have found to be necessary in principle.

Another feature of the present invention is formed by a toner composition, comprising in addition to the hereinbefore specified binder composition one or more magnetizable particles such as ferrites.

The binder composition can be included in the final toner composition in amounts of from 40 to 60 wt % relative to the weight of the total composition and preferably from 45 to 55 wt %.

It will be appreciated that the binder composition and the toner compositions to be derived therefrom can be characterized by their relative simplicity as the binder composition only contains two constituents and the use of it enables lower working temperatures, whereas the quality of the obtained copies are maintained.

The invention is further illustrated by the following examples, however without restricting its scope to these specific embodiments.

EXAMPLE

A composition was prepared from 80 parts by weight of the microcrystalline wax AT-RR9 (drop point 80° C.) which was melted and heated up at a temperature from 140° to 150° C. After 20 minutes, 20 parts by weight of KRATON®G 1701X block copolymer particles, mixed with 0.25 parts by weight per 100 parts by weight of block copolymer of IRGANOX 1010 were gradually added to the heated wax and dissolved therein under stirring. The total mixing time was 1 hour. The deformation temperature moved from 41° C. to 56° C., while maintaining a suitable viscosity. At room temperature the composition showed a good rigidity.

This composition was blended with 100 parts by weight of ferrite and reduced to powder. Image transfer and fixing to paper was found to be carried out by heating up the fuse band at 70° to 75° C., while the toner cleaner was kept at a temperature from 61° to 63° C. and the paper was kept at a temperature at 20° C.

COMPARATIVE EXAMPLE

A composition was prepared, starting from 80 parts by weight of MICROWAX LMP wax, which had a drop point of 71° C. and a congealing range from 62° to 66° C. The wax was melted and heated up at a temperature from 140° to 150° C.

After 20 minutes, 20 parts by weight of KRATON®G 1701X block copolymer particles, mixed with 0.25 parts by weight per 100 parts by weight block copolymer of IRGANOX 1010, were gradually added to the heated wax and dissolved therein under stirring. The total mixing time was 1 hour. At temperatures above 65° C. the composition was found by DMA to show the right viscous response. However at lower temperatures the composition appeared to be too soft and too easily deformed under pressure.

We claim:

1. An binder composition for use in toner compositions, comprising:

from 5 to 35% by weight, relative to the weight of the binder composition, of a block copolymer comprising one predominantly poly(monovinyl aromatic) block per molecule and one predominantly poly(conjugated diene) block per molecule, the poly(conjugated diene) blocks being selectively hydrogenated to a residual unsaturation degree of 20% or lower; and from 95 to 65% by weight, relative to the weight of the binder composition, of a microcrystalline wax having a weight average molecule weight of from 1000 to 10,000 and having a drop point of 75° C. or higher as measured according to ASTM D 3104.

2. The binder composition according to claim 1, wherein the block copolymer comprises pure poly(styrene) blocks and either hydrogenated pure poly(butadiene) blocks or hydrogenated pure poly(isoprene) blocks.

3. The binder composition according to claims 1, wherein the block copolymers have the structure AB, wherein A represents a predominantly poly(monovinyl aromatic) block of an apparent weight average molecular weight of from 5,000 to 50,000 and wherein B represents a predominantly poly(conjugated diene) block of an apparent weight average molecular weight in the range of from 40,000 to 160,000.

4. The binder composition according to claim 3, wherein the block copolymer has a vinyl content in the poly (conjugated diene) block of from 15 to 35%.

5. The binder composition according to claim 3, wherein the block copolymer has a monovinyl aromatic content in the range from 25 to 40%.

6. The binder composition according to claim 3, wherein the poly(monovinyl aromatic) blocks have an apparent molecular weight in the range of from 30,000 to 35,000, while the diblock apparent molecular weight is in the range of from 100,000 to 200,000.

7. The binder composition according to claim 3, wherein the apparent weight average molecular weight of the entire block copolymer is in the range of from 120,000 to 180,000.

8. The binder composition according to claim 1, wherein the block copolymer comprises hydrogenated poly (conjugated diene) blocks having a residual unsaturation in the range of from 5 to 0.5%.

9. The binder composition according to claim 1, wherein the content of block copolymer is from 10 to 25 wt %.

10. The binder composition according to claim 1, wherein the microcrystalline wax has a drop point in the range of from 85° C. to 100° C.

11. The binder composition according to claim 10, wherein the wax has a congealing range starting at 70° C. or higher as measured according to ASTM D 938.

12. The binder composition according to claim 1, wherein the amount of wax is from 90 to 75 wt %.

13. An electrophotographic toner composition, comprising:

an binder composition which comprises:

from 5 to 35% by weight, relative to the weight of the binder composition, of a block copolymer comprising one predominantly poly(monovinyl aromatic) block per molecule and one predominantly poly (conjugated diene) block per molecule, the poly (conjugated diene) blocks being selectively hydrogenated to a residual unsaturation degree of 20% or lower; and from 95 to 65% by weight, relative to the weight of the binder composition, of a microcrystalline wax having a weight average molecule weight of from 1000 to 10,000 and having a drop point of 75° C. or higher as measured according to ASTM D 3104; and further comprising magnetizable particles.

14. The electrophotographic toner composition according to claim 13, wherein the toner composition comprises from 45 to 55 wt %, relative to the weight of the toner composition, of the binder composition.

* * * * *